United States Patent
Magnani et al.

(10) Patent No.: US 10,176,272 B2
(45) Date of Patent: Jan. 8, 2019

(54) SYSTEM AND METHOD OF AUTOMATICALLY SIZING AND ADAPTING A WIDGET TO AVAILABLE SPACE

(75) Inventors: Joseph Andrew Magnani, San Francisco, CA (US); William MacDonald White, Berkeley, CA (US)

(73) Assignee: Excalibur IP, LLC, New York, NY (US)

( * ) Notice: Subject to any disclaimer, the term of this patent is extended or adjusted under 35 U.S.C. 154(b) by 2246 days.

(21) Appl. No.: 11/864,589

(22) Filed: Sep. 28, 2007

(65) Prior Publication Data

US 2009/0089668 A1    Apr. 2, 2009

(51) Int. Cl.
*G06F 17/00*    (2006.01)
*G06F 3/048*    (2013.01)
*G06F 17/30*    (2006.01)

(52) U.S. Cl.
CPC .............................. *G06F 17/30905* (2013.01)

(58) Field of Classification Search
CPC . G06F 17/30905; G06F 17/212; G06F 17/211
USPC ....... 715/764, 788, 234, 815, 273, 243, 246, 715/800, 244, 252
See application file for complete search history.

(56) References Cited

U.S. PATENT DOCUMENTS

| | | | |
|---|---|---|---|
| 6,909,439 B1 * | 6/2005 | Amro et al. ................. 345/660 | |
| 6,920,620 B2 | 7/2005 | Hsiao et al. | |
| 7,216,300 B2 * | 5/2007 | Dang .................... G06F 9/4443 715/738 | |
| 7,386,862 B2 * | 6/2008 | Mussini ................ G06F 9/4443 345/620 | |
| 7,409,635 B2 * | 8/2008 | Epstein ......................... 715/243 | |
| 7,546,543 B2 * | 6/2009 | Louch et al. .................. 715/762 | |
| 7,730,418 B2 * | 6/2010 | Wang et al. .................. 715/800 | |
| 7,761,800 B2 * | 7/2010 | Chaudhri et al. ............. 715/764 | |
| 7,822,806 B2 * | 10/2010 | Frank et al. .................. 709/203 | |
| 7,940,250 B2 * | 5/2011 | Forstall ........................ 345/173 | |
| 7,954,064 B2 * | 5/2011 | Forstall ............... G06F 3/04817 715/765 | |
| 8,255,809 B2 * | 8/2012 | Best ...................... G06F 9/4443 715/735 | |
| 8,301,701 B2 * | 10/2012 | Goodman ............. H04L 12/581 709/206 | |
| 8,522,142 B2 * | 8/2013 | Bhatla et al. ................. 715/719 | |
| 8,566,732 B2 * | 10/2013 | Louch ................. G06F 3/04817 715/764 | |
| 8,645,860 B2 * | 2/2014 | Brenneman ........... G06F 17/211 715/800 | |

(Continued)

OTHER PUBLICATIONS

Javascript Kit, Determining browser dimensions and document scroll offsets, Aug. 22, 2007, Javascript Kit, pp. 1-2 (pdf).*

(Continued)

*Primary Examiner* — Manglesh M Patel
(74) *Attorney, Agent, or Firm* — Martine Penilla Group, LLP

(57) ABSTRACT

A smart-sizing, browser-based widget uses both information defined by a user (e.g., a width value, etc.) and information provided by the web browser and web page within which it is being displayed, to calculate, in real-time, which of its elements to display, and at what scale, so as to make the most efficient use of its available space. The determination as to which elements to display may be a function of a pre-defined relationship among the elements.

22 Claims, 4 Drawing Sheets

(56) References Cited

U.S. PATENT DOCUMENTS

Figure 1A:
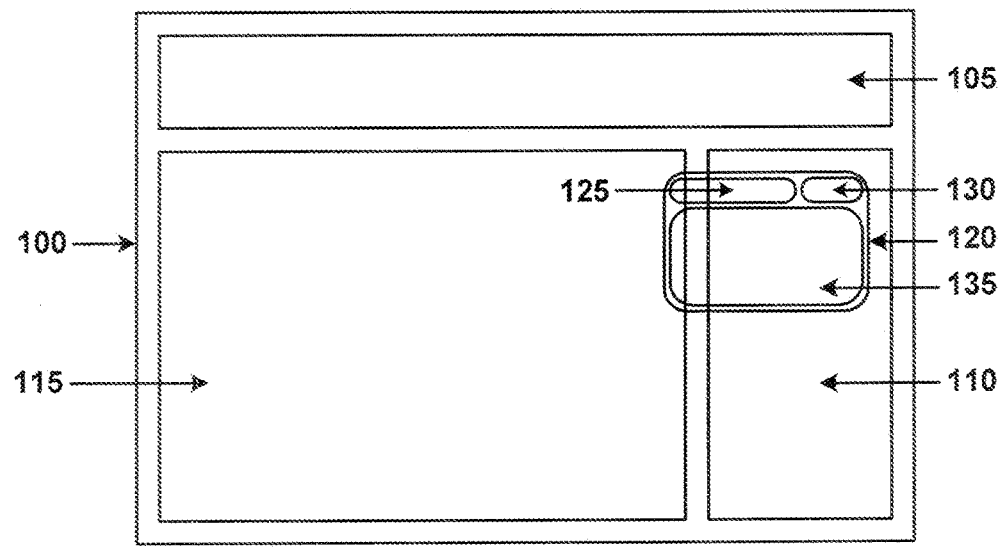

| | | | |
|---|---|---|---|
| 2003/0067489 A1* | 4/2003 | Candy Wong | H04L 67/36 |
| | | | 715/765 |
| 2003/0158975 A1* | 8/2003 | Frank et al. | 709/331 |
| 2004/0215740 A1* | 10/2004 | Frank et al. | 709/217 |
| 2004/0261037 A1 | 12/2004 | Ording et al. | |
| 2005/0234884 A1* | 10/2005 | Drukman et al. | 707/3 |
| 2006/0069808 A1* | 3/2006 | Mitchell et al. | 709/246 |
| 2006/0277469 A1* | 12/2006 | Chaudhri et al. | 715/709 |
| 2007/0162850 A1* | 7/2007 | Adler | G06F 9/4443 |
| | | | 715/700 |
| 2007/0214431 A1 | 9/2007 | Amadio et al. | |
| 2008/0052637 A1* | 2/2008 | Ben-Yoseph | G06F 3/0481 |
| | | | 715/800 |
| 2008/0168367 A1* | 7/2008 | Chaudhri et al. | 715/764 |
| 2009/0100329 A1* | 4/2009 | Espinoza | 715/234 |
| 2017/0031583 A1* | 2/2017 | Levieux | G06F 3/04847 |

OTHER PUBLICATIONS

Kesteren et al., W3C Widgets 1.0, Nov. 2006, W3C, Working Draft 9, pp. 1-11 (pdf).*

\* cited by examiner

SYSTEM AND METHOD OF AUTOMATICALLY SIZING AND ADAPTING A WIDGET TO AVAILABLE SPACE

BACKGROUND

Field of the Invention

Aspects of the present invention relate generally to web-based widgets, and more specifically to widgets that can automatically resize and adapt, in real-time, to the space they are given.

Description of Related Art

As is known in the art, web-based widgets (also known as gadgets, badges, modules, etc.) enable end users to embed various third-party functionality into web pages. Widgets may be used to display a wide variety of information. Examples include the weather forecast for a particular city, or the current stock price of a certain company, news in a particular geographical area, news related to a particular topic, games, and the like. The inclusion of a widget in a web page can be accomplished through JavaScript™, an EMBED element, an embedded Flash® object, or any of a host of other methods which bring the widget code into the web page, where the widget runs locally within a user's browser. While the widget code can consist entirely of Hypertext Markup Language (HTML), widgets are more commonly developed either in JavaScript™ or Adobe® Flash®.

Traditionally, third-parties have offered widgets either in a single size or in a small number of varying sizes, sometimes with varying levels of functionality. For example, Yahoo!™ Finance offers a customizable widget for displaying financial information, which can include quotes, charts, and news, in any combination as decided by the user. After choosing which of the three types of information he wants the widget to display, the user must then specify various other elements, such as the number of news headlines to display, which stock symbols to follow, and finally the width [and sometimes height] of the module.

Even though multiple sizes are offered, their limited number cannot account for all web-page sizing variations; not only do web pages come in a wide number of styles and designs, but an end user ultimately has control, to a greater or lesser relative extent, over the monitor size and the web browser dimensions; if the web page is designed using mostly relative constraints, then the size of the web page can vary widely depending on monitor size, browser-window size, etc. Additionally, changing the size of a widget is often a frustrating experience for an end user who usually must repeat the entire settings-choosing process, including placing the widget code on the web page.

Thus, it would be desirable to use a widget that can size itself automatically relative to the dimensions within which it is being presented.

SUMMARY

In light of the foregoing, it is a general object of the present invention to automatically size a web-based widget relative to its real-time constraints to make optimal and efficient use of available space.

BRIEF DESCRIPTION OF THE DRAWING FIGURES

Figure 1B:
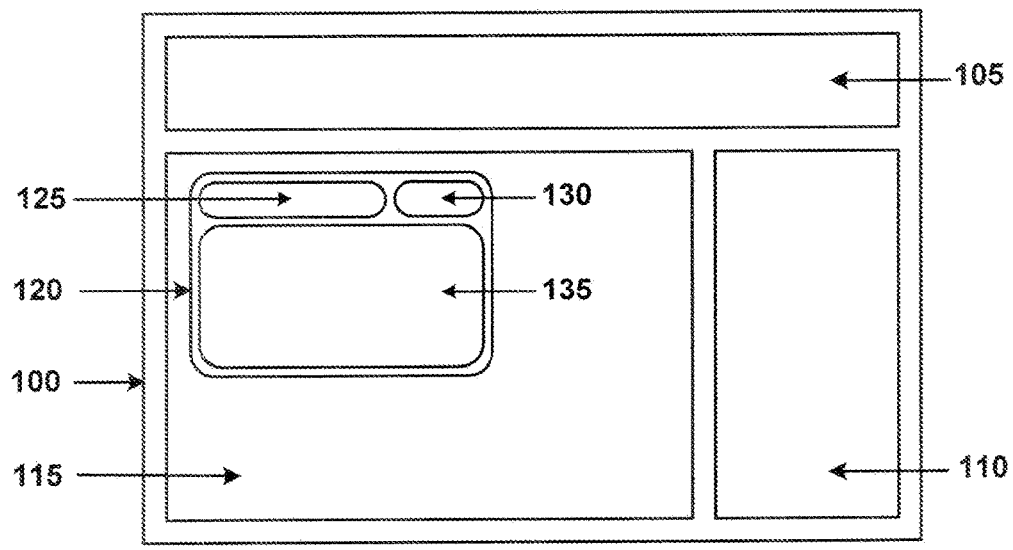
Figure 2A:
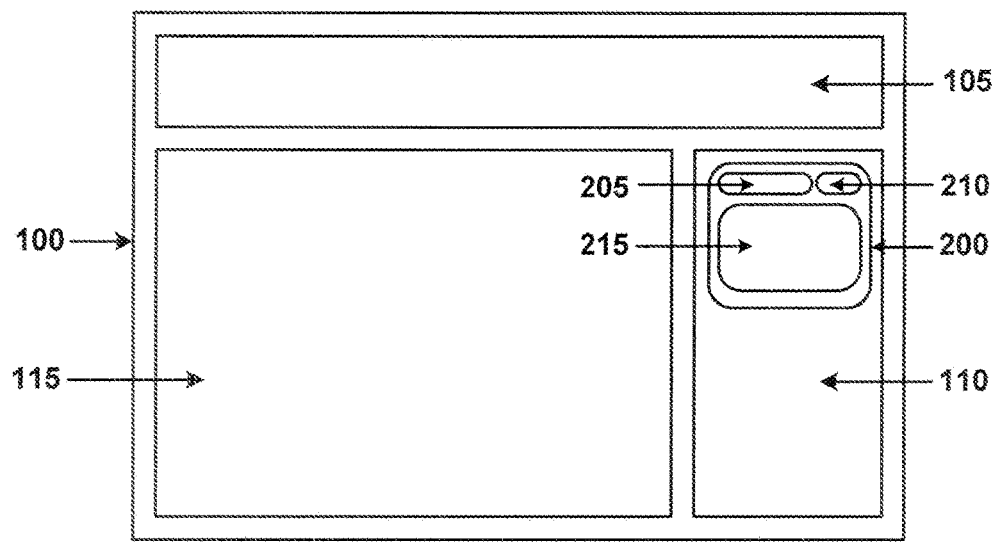
Figure 2B:
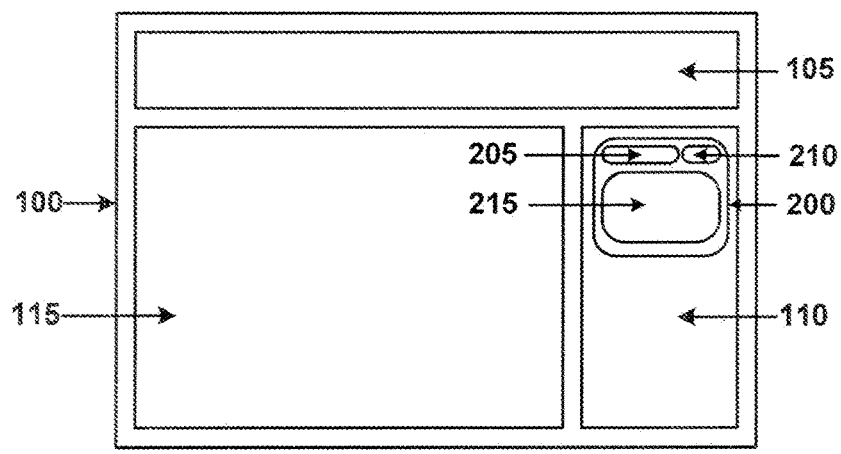
Figure 2C:
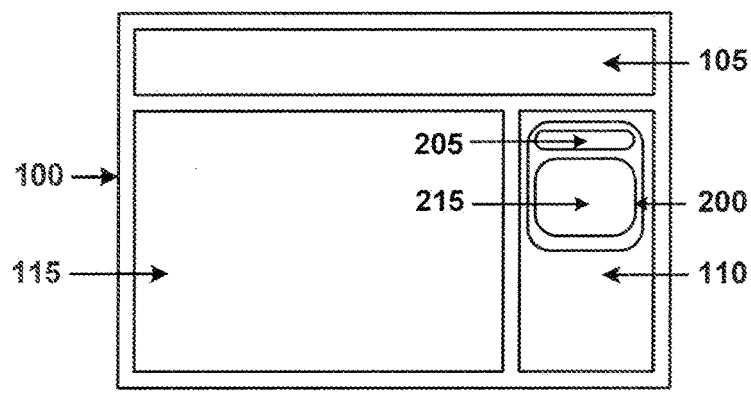
Figure 3:
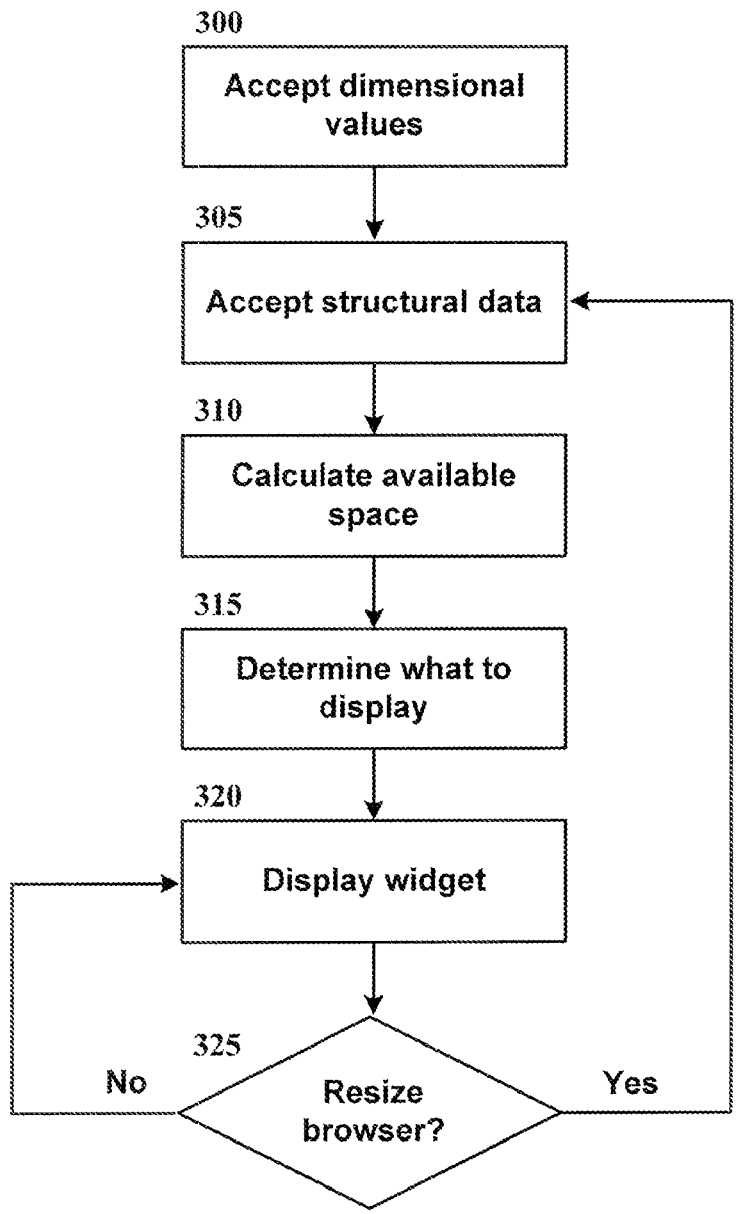
Figure 4:
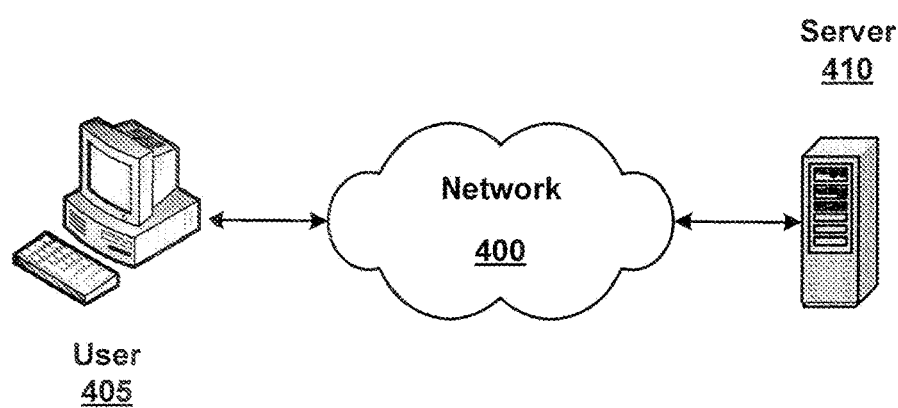

FIGS. 1A and 1B illustrate a fixed-size widget.
FIGS. 2A-2C illustrate an exemplary embodiment of the present invention.
FIG. 3 is a logical flowchart of the general process by which widgets are automatically sized.
FIG. 4 is a simplified block diagram illustrating how the invention may be employed in accordance with the detailed description.

DETAILED DESCRIPTION

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of automatically sizing web-based widgets to make optimal and efficient use of their bounded space.

FIG. 1 illustrates conventional fixed-size widgets. As generally understood in the art, web page 100 is a web page as it might be rendered in a web browser. Sections 105, 110, and 115 are the different sections of the page as defined by Hypertext Modeling Language (HTML) and/or Cascading Style Sheets (CSS), which are generally used to describe the presentation of a document written in a markup language (e.g., HTML, etc.). Widget 120 is any widget embedded in a web page (e.g., one that displays weather information, stocks, etc.). Within Widget 120 are various elements 125, 130, and 135, which display information, control some aspect of the widget, etc.; obviously there can be any number of elements in a widget. As discussed above, widgets generally come in only one size, and even when multiple sizes are offered they are generally not scalable or changeable beyond the various sizes given.

In light of the immutable nature of current widgets, it is often the case that they do not or cannot fit into an already-established web page layout. As a result, the web pages can look different from what the designer intends. For example, as shown in FIG. 1A, widget 120 is too large and cannot fit within section 110 where the designer would like it to go. Because the widget does not fit, it overflows out of section 110 and into section 115. It will be understood by those of skill in the art that the "error" may be worse than just the widget overflowing out of its section; depending on the widget, the HTML and/or CSS, and the web browser used to view the web page, errors may include section 115 being pushed down and out of view, widget 120 not appearing at all, section 115 being resized to fit widget 120, etc.

Similarly, as shown in FIG. 1B, widget 120 may take up more space than the user would like. For example, in FIG. 1B, widget 120 is offered in only a single size that takes up more than half of section 115. Moreover, if the web page is built in such a way as to scale with the size of the browser window, the widget 120 takes up an increasing amount of space as the size of the window, and subsequently the size of the web page, decreases. If the designer is intent on having this particular widget on his web page, he may have to redesign the web page to accommodate it.

FIG. 2 illustrates various embodiments of a smart-sizing widget. The widgets shown in FIGS. 2A, 2B, and 2C are all the same widget 200; each web page 100 using widget 200 utilizes the same widget code, which allows widget 200 to resize itself automatically relative to where it is being placed. As shown in FIG. 2A, widget 200 includes elements 205, 210, and 215. It will be appreciated by those of skill in the art that widgets can comprise any number of elements, depending on the information the widgets are meant to convey and the interactivity they are meant to provide.

For example, widget 200 may be a music player, in which case element 205 may be playback controls (e.g., play, pause, forward, back, etc.), element 210 may be a volume control, and element 215 may be a list of available songs. As shown in FIGS. 2A and 2B, all three elements are available to the user, but in FIG. 2C, only elements 205 and 215 are available; widget 200 determines, based on its available space—note that the size of the web page and its constituent sections vary as between FIGS. 2A, 2B, and 2C—the elements it should display and at what size.

The decision as to what to display is pre-determined, to some extent, by the designer of the widget, who may define a functional relationship between the widget elements so as to give the elements an order of importance (e.g., element one should always be displayed, element two should be displayed as long as element one still fits, etc.). In one embodiment, the designer may structure the functional relationship as a hierarchy; in such a case, the widget may reference that hierarchy to determine which elements to display. For example, if elements 205 and 215 are at the top of the element hierarchy and widget 200 determines that there is only enough room for two of the three available elements, then only elements 205 and 215 will be displayed (as shown in FIG. 2C), because they take precedence over element 210. In another embodiment, the widget elements may be able to scale their sizes, either relative to each other or relative to the dimensions in which the widget may reside (or some combination thereof). For example, all three elements of FIG. 2A may be able to fit comfortably into a 300×400 pixel space as well as a 200×300 pixel space if each of the elements resizes itself to make the best use of the available space. To this end, the hierarchical rules governing the position of the various elements may include rules specifying how much a given element may be resized. These sizing rules may be specified in various ways, such as, for example, as an amount relative to the other elements, as a function of the overall width of the widget, etc.

In one embodiment, the decision regarding which widget elements to display is a function of structural data related to the user's web browser and the web page within which the widget resides, such as, for example, the resolution of the user's monitor, the dimensions of the user's browser window, markup and associated data (as described more fully below), etc. This may be especially useful where the widget is the only thing displayed on a web page (i.e., where there is no HTML and/or CSS defining a layout). As the browser window is resized by the user, the widget will determine, in real-time, the widget elements to be displayed. If there is enough room for all of the elements, then all of the elements will be displayed. However, as the browser window is made smaller, and all of the widget elements can no longer fit, the widget will resize itself to fit as best it can within the browser window using the methods described above.

Similarly, the decision regarding which widget elements to display may be informed in part by the HTML and/or CSS that defines the web page on which the widget is used. For example, if the space within which the widget is to go is structured by a CSS "div" element, defined by some width, then the widget may be "built" and sized so as to fit within those constraints. Comparatively, if the widget is to reside within an HTML "table" element, it can resize itself to accommodate its given space by taking into account the dimensions of the table.

In another embodiment, the widget may accept dimensional values as set by the user, which can inform the decision regarding which widget elements to display. Dimensional values can be either relative or absolute. Relative dimensional values can be described as a ratio between the width and/or height of the widget and some other entity. For example, if a user specifies that the width of widget 200 should be 50%, then, after web page 100 has been drawn, and widget 200 knows within what dimensions it has to work, it halves the available width (i.e., 50%) and sizes widget elements 205, 210, and 215 as best it can. If the dimensional values given by the user are set absolutely, then widget 200 will size widget elements 205, 210, 215 to fit within the absolute dimensions and will essentially ignore any other structural information provided by the underlying HTML, CSS, browser, etc. For example, referring again to FIGS. 2A-2C, web page 100 may have a header section 105, a menu section 110, and a main content section 115. Within this layout, the user may wish to display widget 200 inside menu section 110, which has been defined, for example, as always being 400 pixels wide. In this case, if the user wants to take full advantage of the available width, he may specify the width of widget 200 as, for example, 398 pixels; widget 200 then determines how best to fit the widget elements into that space and maintains the determined layout until the user changes its dimensional values.

In yet another embodiment, the decision regarding what elements to display and at what size, etc., may be informed by contextual data received by the widget (e.g., the data's volume, type, structure, etc.). For example, if the smart-sizing widget is a music player that receives song information from disparate sources (e.g., screen-scraped HTML, Atom, etc.), one source may supply comments along with the song while another may not. In such a case, the smart-sizing widget may deduce from the received song information that a comment is to be displayed for a particular song, along with the other song information (e.g., title, author, etc.); the contextual data may thus allow for more granular and dynamic control over the information to be displayed within the various widget elements.

FIG. 3 is a logical flowchart of the general process by which widgets are automatically sized and resized according to one embodiment of the invention. As illustrated at block 300, the widget may accept dimensional values, as discussed above (either as absolute or relative values). The dimensional values may be specified in a number of different ways, such as, for example, as arguments to the function that embeds the widget within the web page, etc. At block 305, the widget may accept structural data from the web browser, and at block 310 may determine the total space available to the widget, defined, for example, through width and height values. Once the widget has this information, it can then determine, at block 315, the size of the widget, the size of the widget elements, and which widget elements will be displayed, as a function of some combination of the dimensional values as inputted by the user and the structural data received from the web browser. After the layout of the widget has been determined, the widget is displayed on the web page at block 320. During its display, if the user resizes the browser window at block 325, the widget can update its size and element structure in real-time, so as to constantly make the most efficient use of its space, even as that space fluctuates.

The sequence and numbering of blocks depicted in FIG. 3 is not intended to imply an order of operations to the exclusion of other possibilities. Those of skill in the art will appreciate that the foregoing systems and methods are susceptible of various modifications and alterations. For example, the widget may not allow the user to input dimensional values, and so block 300 would not be needed. As another example, the widget may not adapt and resize in real-time to the resizing of the browser window, in which case the displaying of the widget at block 320 would persist until the user closed the browser window, refreshed the web page, etc.

FIG. 4 is a simplified block diagram illustrating how the invention may be employed. Similar to other web-based widgets, a smart-sizing widget may be embedded in a web page (as discussed herein) where it may be accessed by user 405 through a web browser; the widget may receive, over a network 400 (e.g., the Internet), and from Server 410, the information it is to display (e.g., stock quotes, weather information, etc.).

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
    receiving structural data associated with a web page, the web page including a widget, the widget including a plurality of widget elements, wherein the structural data includes a size of a browser window used to display the web page;
    accessing a constraint regarding a pre-determined number of the widget elements to display within the widget;
    triggering during a display of the browser window and the plurality of widget elements a reduction in a size of the widget and a reduction in a plurality of sizes of the widget elements to display within the widget when the size of the browser window reduces;
    removing one or more of the widget elements from being displayed within the widget after reducing the sizes of the widget elements, wherein said removing the one or more of the widget elements is performed until the constraint is achieved;
    increasing a size of remaining one of the widget elements of the reduced size to fit within the widget of the reduced size upon achieving the constraint; and
    sending data for displaying the widget.

2. The method of claim 1, further comprising:
    receiving dimensional values of the widget; and
    determining the size of the widget based on the dimensional values and the structural data;
    wherein sending the data includes sending data for displaying the widget with the reduced size of the widget.

3. The method of claim 2, wherein the dimensional values include height and width values for the widget.

4. The method of claim 1, further comprising:
    receiving dimensional values for the widget that define a percentage of the size of the widget with respect to the size of the browser window used to display the web page; and
    determining the size of the widget based on the dimensional values for the widget and the structural data; wherein sending the data comprises sending data for displaying the widget with the reduced size of the widget.

5. The method of claim 1, wherein the structural data associated with the web page describes a layout of the web page.

6. The method of claim 1, wherein the reduction in the sizes of the widget elements to display within the widget is based on information from a hierarchy that ascribes to each of the widget elements a level of importance.

7. The method of claim 1, wherein reduction in the sizes of the widget elements is based on contextual data associated with the widget.

8. The method of claim 1, further comprising resizing the widget when the constraint is violated.

9. The method of claim 1, wherein the one or more of the widget elements that are removed have a lower importance compared to the remaining one of the widget elements that is not removed.

10. A non-transitory computer-readable medium encoded with a computer-executable program to perform a method comprising:
    receiving structural data associated with a web page, the web page including a widget, the widget including a plurality of widget elements, wherein the structural data includes a size of a browser window used to display the web page;
    accessing a constraint regarding a pre-determined number of the widget elements to display within the widget;
    triggering during a display of the browser window and the plurality of widget elements a reduction in a size of the widget and a reduction in a plurality of sizes of the widget elements to display within the widget when the size of the browser window reduces;
    removing one or more of the widget elements from being displayed within the widget after reducing the sizes of the widget elements, wherein said removing the one or more of the widget elements is performed until the constraint is achieved;
    increasing a size of remaining one of the widget elements of the reduced size to fit within the widget of the reduced size upon achieving the constraint; and
    sending data for displaying the widget.

11. The non-transitory computer-readable medium of claim 10, wherein the method further comprises:
    receiving additional structural data that indicates that the browser window used to display the web page has been resized by a user;
    receiving dimensional values for the widget; and
    determining an additional size of the widget based on the dimensional values for the widget and the additional structural data;
    wherein sending the data includes sending data for displaying the widget with the additional size of the widget.

12. The non-transitory computer-readable medium of claim 10, wherein the method further comprises:
    receiving additional structural data that indicates that the browser window used to display the web page has been resized by a user; and
    selecting additional widget elements to display within the widget based on the additional structural data.

13. The non-transitory computer-readable medium of claim 10, wherein the method further comprises:
receiving dimensional values for the widget; and
determining the size of the widget based on the dimensional values and the structural data;
wherein sending the data includes sending the data for displaying the widget with the reduced size of the widget.

14. The non-transitory computer-readable medium of claim 10,
wherein the method further comprises:
receiving dimensional values for the widget that define a percentage of the size of the widget with respect to the size of the browser window used to display the web page; and
determining the size of the widget based on the dimensional values for the widget and the structural data;
wherein sending the data includes sending the data for displaying the widget with the reduced size of the widget.

15. The non-transitory computer-readable medium of claim 10, wherein the one or more of the widget elements that are removed have a lower importance compared to the remaining one of the widget elements that is not removed.

16. A system comprising:
a processor-based computer configured to execute a plurality of software modules, the plurality of software modules including:
a size determination module, wherein the size determination module is configured to determine a size of a widget based on data associated with a size of a browser window having a web page, the widget displayed on the web page, the widget including a plurality of widget elements;
a constraint module configured to access a constraint regarding a pre-determined number of the widget elements to display within the widget;
a trigger module configured to trigger during a display of the browser window and the plurality of widget elements a reduction in a size of the widget and a reduction in a plurality of sizes of the widget elements to display within the widget when the size of the browser window reduces,
wherein the trigger module is configured to remove one or more of the widget elements from being displayed within the widget after reducing the sizes of the widget elements, wherein the one or more of the widget elements are removed until the constraint is achieved,
wherein the trigger module is configured to increase a size of remaining one of the widget elements of the reduced size to fit within the widget of the reduced size upon achieving the constraint; and
a widget transfer module configured to send data for displaying the widget.

17. The system of claim 16, wherein the size determination module is further configured to determine the size of the widget based on data identifying an absolute value for the widget with respect to the size of the browser window.

18. The system of claim 16, wherein the size determination module is further configured to determine the size of the widget based on data identifying a relative value for the widget with respect to the size of the browser window.

19. The system of claim 16, further comprising a widget selection module configured to select one or more of the widget elements from a group of candidate widget elements.

20. The system of claim 16, further comprising a widget selection module configured to select a number of the widget elements that is less than a number of eligible elements.

21. The system of claim 16, further comprising a widget selection module configured to select the widget elements based on reviewing a hierarchy associated with importance levels for the widget elements.

22. The system of claim 16, wherein the one or more of the widget elements that are removed have a lower importance compared to the remaining one of the widget elements that is not removed.

* * * * *